United States Patent Office 3,149,126
Patented Sept. 15, 1964

3,149,126
ORGANIC PEROXIDES OBTAINED BY REACTION OF HYDROGEN PEROXIDE WITH ALKANEDIONES
Nicholas A. Milas, Belmont, Mass., assignor to Massachusetts Institute of Technology, a corporation of Massachusetts
No Drawing. Filed Jan. 11, 1961, Ser. No. 94,099
15 Claims. (Cl. 260—338)

In my U.S. patent application Ser. No. 824,219, filed July 1, 1959, now Patent No. 3,003,000, I have described the preparation and isolation in the pure state of organic peroxides derived from the reaction of simple aliphatic monoketones and hydrogen peroxide. The present invention relates to novel organic peroxides obtained by the interaction of hydrogen peroxides with alkanediones of the general formula R—CO—R$^1$—CO—R wherein R$^1$ is a lower alkylene group and the R's are lower alkyl groups.

For the purpose of illustrating the principles of the invention, the application more particularly describes the preparation and isolation of novel organic peroxides derived from the interaction of 1,3-diketones, exemplified by acetylacetone, and 1,4-diketones exemplified by acetonylacetone and hydrogen peroxide. Using both types of diketones, a series of well-defined crystalline peroxides have been produced which are useful as catalysts in polymerization reactions and in cross-linking simple polymers. Owing to the ease of solubility of these peroxides in water, they may also be useful in emulsion polymerizations. In view of this latter property, these peroxides may find extensive use in medicine as topical germicides and as bleaching agents. Since the more highly oxygenated members of this group of peroxides are also highly explosive, they may find uses as additives in rocket fuels.

Since acetylacetone (I) is known to exist mainly in the enol form (II) hydrogen peroxide probably adds to form the open chain peroxide (III) which changes spontaneously to the cyclic form (IV). This change is confirmed by the infrared spectrum of this peroxide which shows the presence of two hydroxyl groups and the complete absence of the carbonyl group.

with phosphorus pentoxide in anhydrous ether. Moreover, peroxide (VI) can be prepared directly by the addition of three moles of hydrogen peroxide to the ketone (II) in the presence of hydrogen ion. In this case, the dimeric peroxide (VIII) is also formed. This peroxide can also be prepared by mixing equimolecular proportions of peroxides (V) and (VI) in water in the presence of hydrogen ion or in anhydrous ether in the presence of phosphorus pentoxide.

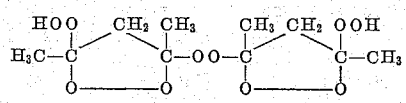

VIII

When the reaction in the presence of hydrogen ion is performed in the presence of large excess of hydrogen peroxide the highly explosive peroxide (IX) may also be formed.

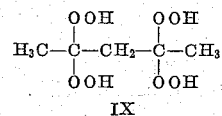

IX

Peroxides (VI) and (VIII) easily form diperesters as well as dialkyl peroxides using the standard procedures already known in the art.

When 2,5-hexanedione was allowed to react in the absence of acid with 50% hydrogen peroxide at room temperature for four days, a mixture of five different peroxides was formed as detected by paper chromatography [N. A. Milas and I. Belič, J. Am. Chem. Soc., 81, 3358 (1959)]. Each peroxide present in the mixture was estimated by its R$_f$ to be approximately as follows R$_f$: O.O, about 85%; 0.09, 0.220, 9%; 0.350, traces; 0.665, 6%. When the reaction mixture was extracted with pentane all peroxides, except the one with R$_f$ O.O, went into the pentane layer. After washing with saturated solution of ammonium sulfate and drying, the pentane solution was cooled to −70° C. Although the crystals which separated out were recrystallized several times from pentane, they always contained traces of peroxides with R$_f$'s 0.09 and

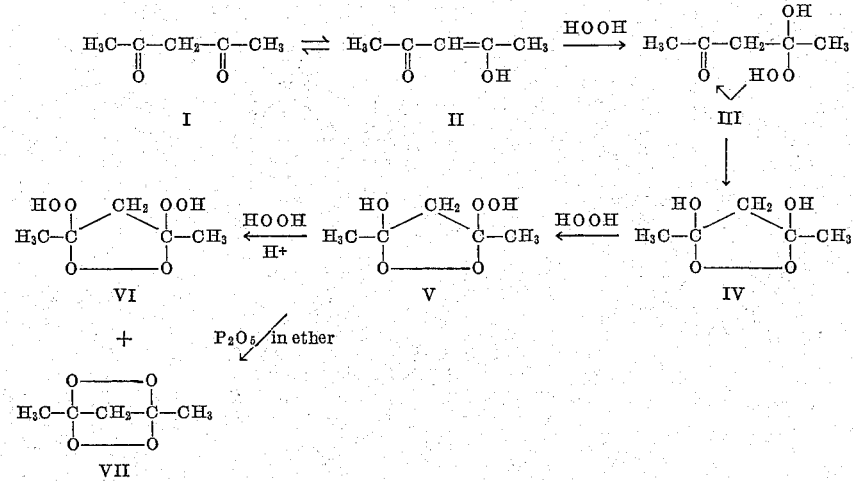

Peroxide (V) is formed either by adding one mole of hydrogen peroxide to peroxide (IV) or adding directly two moles of hydrogen peroxide to the ketone (II). Similarly, peroxide (VI) can be prepared by adding two moles of hydrogen peroxide to peroxide (IV) or one mole to peroxide (V), both in the presence of hydrogen ion. In addition to peroxide (VI), small amounts of peroxide (VII) are formed which can be produced in higher yields by the dehydration of peroxide (V) at low temperatures 0.350 respectively. The crystals were finally subjected to cellulose powder chromatography using the technique previously reported [N. A. Milas and A. Golubović, J. Am. Soc., 81, 3361 (1959)] and the peroxide obtained had a M.P. of 135° C. and gave a single spot on a paper chromatogram with R$_f$, 0.220. An infrared spectrum 10% in chloroform of this peroxide showed strong bands for —OH, —OOH, —O—O— and —O— groups. Moreover, analytical data, including the molecular weight determined in dioxane by the cryoscopic method, gave a strong support of the dihydroperoxy structure (X). Additional support was given by the preparation of its bis-p-nitrobenzoate derivative (XI).

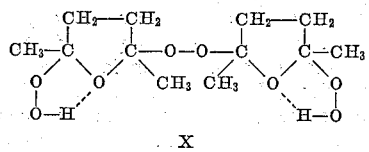

X

The pentane mother liquor, after all of the peroxide (X) had been removed at low temperatures, contained all of the peroxide with $R_f$, 0.0665 and traces of the peroxides with $R_f$'s, 0.09 and 0.350. The pentane solution was subjected to column cellulose chromatography and the peroxide with $R_f$, 0.665 obtained in the pure state. It has a M.P. of 105° C. and shows a single spot on the paper chromatogram with an $R_f$, 0.665. It is very volatile and reacts very slowly with potassium iodide in glacial acetic acid. Its infrared spectrum 10% in chloroform failed to show any hydroxy or hydroperoxy bands but had strong bands in the regions attributed to —O—O— and —O— groups. From the analytical data and molecular weight determinations, this peroxide can best be represented by structure (XII).

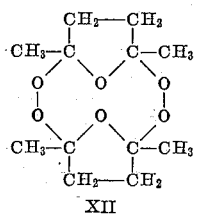

XII

When the mole ratio of acetonylacetone to hydrogen peroxide was 1:1 or 1:2, the yields of the various peroxides were essentially the same with the peroxide $R_f$, 0.0 present in the larger amount, about 85%; but when the ratio was changed to 1:4, the latter peroxide was the only peroxide formed. This peroxide is a highly viscous liquid with an active oxygen of 19.5% and an infrared spectrum which showed strong hydrogen bonding. Since the solubilities of this peroxide and acetonylacetone were identical, it was not possible to separate one from the other and attempts to form derivatives were unsuccessful. In an attempt to crystallize it from water, it underwent a quantitative conversion to peroxide (X). Moreover, when it was subjected to a prolonged high vacuum (0.1 mm.) pumping at 50° C., it was again converted to peroxide (X). Furthermore, when this peroxide was dissolved in anhydrous ether and the solution treated at low temperatures with phosphorus pentoxide, peroxide (XII) was produced in about 70% yield and peroxide (X) in about 10–12% as estimated chromatographically.

On the basis of these results, one may formulate the following sequence of reactions when hydrogen peroxide is allowed to react in neutral solution with 2,5-hexanedione.

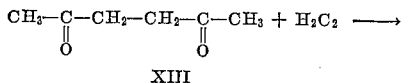

XIII

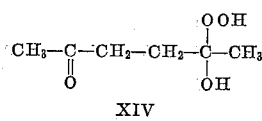

XIV

Since there is a greater tendency for the formation of the tetrahydrofuran ring than the hexahydropyran ring, peroxide (XIV) is more likely to rearrange to give peroxide (XV) than (XVI). Peroxide (XVI) forms in acid solution.

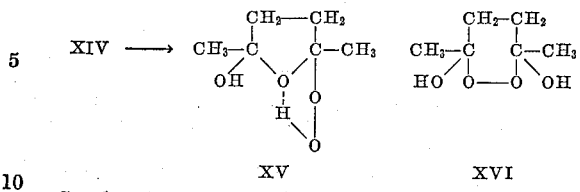

XV  XVI

In the presence of phosphorous pentoxide, peroxide (XV) could easily dehydrate to form peroxide (XII) while in neutral solution it can react with itself to form peroxide (XVII) which in the presence of excess hydrogen peroxide could easily go over to peroxide (X).

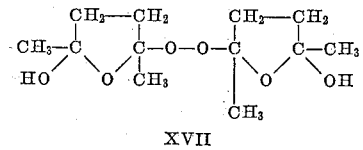

XVII

In acid solution, on the other hand, peroxide (XVI) is apparently formed since the main peroxide isolated under these conditions has the structure (XVIII).

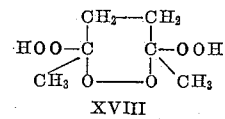

XVIII

EXAMPLE 1

*Preparation of peroxide (IV).*—To 30.0 g. of freshly distilled 2,4-pentanedione (acetylacetone), B.P. 137–138° C., free from organic acids and cooled to 0° was added dropwise in the course of ½ hr. with frequent shaking 20.40 g. of 50% hydrogen peroxide. The mixture was allowed to stand at 0° with occasional shaking for 4 hrs. whereby it crystallized into a solid mass. The solid was separated by filtration and allowed to dry on a porous plate overnight; M.P. 57–61° C.; yield, 35 g. (87%). This was extracted in a soxhlet with hot petroleum ether. Only small amounts of impurities were extracted. The remaining solid was recrystallized at —10° C. from either anhydrous ether or dichloromethane; M.P. 85–86° C.

*Analysis.*—Calcd. for $C_5H_{10}O_4$: C, 44.77; H, 7.51; (O), 11.93. Found: C, 44.75; H, 7.32; (O), 12.12 (KI +$CH_3COOH$ method).

This peroxide is very soluble in water and is not sensitive to shock. The infrared spectrum of a nujol mull of this peroxide showed the following bands in cm.$^{-1}$, the numbers in parentheses giving the intensity of each band: 3350(8.6); 2850–2980(9.7); 1460(9.1); 1450(9.1); 1415(7.6); 1375(8.9); 1308(8.4); 1200(8.8); 1165(8.8); 1078(8); 972(8.1); 918(6.7); 890(4.2); 860(8.5); 825(7.9); 728(6.8).

EXAMPLE 2

*Preparation of peroxide* (V).—To 40.8 g. (0.6 moles) of 50% hydrogen peroxide maintained at 0° C. was added dropwise with rapid stirring 30 g. of freshly distilled neutral 2,4-pentanedione. Stirring was continued at room temperature for four days; then the mixture extracted with pentane, but no peroxidic product was extractable. The aqueous layer was then extracted with 2×50 ml. of ethyl ether; the ether extract washed with saturated solution of ammonium sulfate, dried over magnesium sulfate and the ether removed in vacuum leaving a white crystalline residue which was dissolved in 100 ml. of dichloromethane by refluxing the solution. When the latter was cooled to —10° C., 5.13 g. of a colorless crystalline product separated out, M.P. 105° C. without decomposition.

When the original aqueous layer was allowed to evaporate in an open dish and the solid obtained recrystallized from boiling dichloromethane, an additional 11.47 g. of pure peroxide was obtained; total yield, 16.6 g. (37%). This peroxide is insoluble in ordinary solvents, so that the mol. wt. was determined in dioxane, $R_f$, 0.0 (Whatman No. 1 using dimethylformamide-decalin as the developing solvent).

*Analysis.*—Calcd. for $C_5H_{10}O_5$ (V), C, 40.01; H, 6.71; (O), 21.31; mol. wt., 150.1. Found: C, 40.01; H, 6.68; (O), 21.31; mol. wt., 148 (cryoscopic in dioxane).

The infrared spectrum using the mull method in nujol showed the following bands in cm.$^{-1}$: 3450(8); 3300 (8.5); 2850–2928(10); 1440–1460(10); 1370(9.5); 1300(8.2); 1275(6.7); 1150–1170(9); 1080(8.5); 1040 (4.5); 960(8.5); 930(4.5); 915(5.3); 890(7.6); 845(8.8); 820(8.4); 800(8.8).

Peroxide (V) is sensitive to shock; it is stable indefinitely at 50° but decomposes slowly at 70° C. with evolution of oxygen. Attempts to prepare the p-nitrobenzoate derivative were not successful.

Peroxide (V) was also prepared in somewhat higher yields by allowing peroxide (IV) to react in water solution at 0° with one mole equivalent of hydrogen peroxide.

EXAMPLE 3

Preparation of Peroxide (VI): To a mixture of 109 g. (1.6 moles) of 50% hydrogen peroxide and 1.4 g. of sulfuric acid maintained at 0° C. was added dropwise in the course of ¾ hrs. with rapid stirring 50 g. (0.5 mole) of pure 2,4-pentanedione. The mixture was allowed to stand at 0° C. overnight, then extracted with 3×300 ml. of pure ether and the ether extracts shaken for several hours with about 15 g. of magnesium carbonate containing 40% magnesium oxide. Finally, the ether was dried over magnesium sulfate, filtered and the ether removed under reduced pressure. A white solid residue remained; yield, 75 g. This was recrystallized several times from hot dichloromethane and the fractions (63% of the original) which crystallized in large plates at room temperature had an M.P. of 108° C. (without decomposition). This peroxide is extremely sensitive to shock and explodes with considerable brisance.

*Analysis.*—Calcd. for $C_5H_{10}O_6$: C, 36.16; H, 6.07; (O), 28.9. Found: C, 36.38; H, 6.22; (O), 29.1

(HI+CH$_3$COO method)

28.9 (KI+CH$_3$COOH method).

The infrared spectrum using the null method showed the following bands in cm.$^{-1}$: 3350(7); 2900(9.7); 1460–1450(9.4); 1370(9.1); 1330(6.4); 1225(5.7); 1165 (7.4); 1090(6.1); 950(5.1); 918(4.9); 890(5.3); 845 (5.9); 810(4.5); 785(5.8); 720(4.1).

When the mother liquors from the above crystallizations were worked up, a crystalline peroxide (needles) was obtained in yields of about 10% of the original, M.P. 95–96° C.

*Analysis.*—Calcd. for $C_{10}H_{18}O_{10}$ (VIII): (O), 26.92. Found: (O), 26.71.

From the final mother liquors was isolated in small amounts a volatile peroxide, M.P. 119–120° C., which was identical with the peroxide of Example 5.

The bis-p-nitrobenzoate of (VI) was prepared by mixing in 20 ml. of dry pyridine at 0° C. 2.1 g. of p-nitrobenzoic acid and 4.3 g. benzenesulfonyl chloride and adding to the mixture 1.0 g. of peroxide (VI). The mixture was allowed to stand at 0° for two hrs. then poured on ice and the solid which separated collected and dried in air; yield 2 g. (71%). This derivative was recrystallized from ethyl alcohol, M.P. 175° C. (dec.).

*Analysis.*—Calcd. for $C_{19}H_{16}N_2O_{12}$: C, 49.14; H, 3.47; N, 6.04; (O), 10.34. Found: C, 49.42; H, 3.53; N, 5.94; (O), 10.36 (HI+CH$_3$COOH method).

An infrared spectrum of this derivative using the mull method showed the following bands in cm.$^{-1}$: 2900(9.8); 1775(5.7); 1606(2.4); 1520(5.5); 1462–1450(9.1); 1400 (2.9); 1372(8.1); 1342(7.2); 1230(6.8); 1180(4.2); 1160(4.8); 1095(3.3); 1042(6.7); 1010(5.3); 950(2.9); 925(2.9); 870(40); 850(5.1); 790(1.8); 775(1.8); 710 (6.3).

EXAMPLE 4

*Preparation of peroxide (VI)—Alternate process.*—In this process peroxide (IV) was allowed to form first; then to the mixture was added a solution of hydrogen peroxide containing sulfuric acid. The process was carried out as follows: To 21 g. (0.3 mole) of 50% hydrogen peroxide maintained at 0° C. was added dropwise with rapid stirring 30 g. (0.3 mole) of 2,4-pentanedione. Stirring was continued at 20° C. for 3 hrs., then 63 g. (0.9) of 50% hydrogen peroxide containing 0.2 g. of 70% sulfuric acid was added dropwise. The mixture was stirred for 7 hrs. maintaining the temperature at 25° C. The mixture was then stored at 10° C. for 12 hrs., then stirred again at 25° C. for 7 hrs. longer.

The entire mixture was then subjected to a vacuum at room temperature to remove the volatile materials. A crude solid residue of 31 g. (62% yield) was obtained. This was recrystallized from hot dichloromethane to give 13 g. (26%) of a colorless crystalline product, M.P. 103° C. (without decomposition). This product, like peroxide (VI) of Example 3, is extremely sensitive to shock and explodes with considerable brisance.

*Analysis.*—Calcd. for $C_5H_{10}O_6$: (O), 28.9. Found: (O), 28.7 (HI+CH$_3$COOH method).

The infrared spectrum using the mull method showed the following bands in cm.$^{-1}$: 3350(6); 2800–2700(10); 1450(8); 1375(7.5); 1220(4.5); 1165(6.8); 1085(4); 950(4); 890(4.2); 855–850(5.5); 790(5).

EXAMPLE 5

*Preparation of peroxide (VII).*—To 100 mg. of peroxide (V) dissolved in 100 ml. of anhydrous ether and the solution cooled to 0° C. was added with frequent shaking 2 g. of phosphorus pentoxide in eight equal portions during 8 hrs. The mixture was then filtered into a separatory funnel and the ether solution washed successively each with 50 ml. of saturated solution of sodium bicarbonate and water, dried over magnesium sulfate, filtered and the filtrate concentrated in vacuum to ¼ its original volume. When the solution was cooled to −10° C. long, colorless needles crystallized (50%) yield) which were recrystallized from ether, M.P. 119–120°. A paper chromatogram using Whatman paper No. 1 impregnated with dimethylformamide and developed with decalin saturated with dimethylformamide gave a single spot when sprayed with a mixture of hydrogen iodide and glacial acetic acid with an $R_f$ of 0.083. This peroxide is very volatile and the chromatogram should be sprayed immediately after development. It is also sensitive to shock and explodes with considerable brisance.

*Analysis.*—Calcd. for $C_5H_8O_4$: C, 45.44; H, 6.10; (O), 24.2; mol. wt., 132. Found: C, 45.26; H, 5.97; (O), 24.2 (HI+CH$_3$COOH method); mol. wt., 133 (cryoscopic in dioxane).

The infrared spectrum 10% in chloroform showed the following principal bands in cm.$^{-1}$: 3000(5.5); 2980(2.5); 1440(6); 1435(8.5); 1375(9.5); 1320(9.5); 1230–1210(4.5); 1190(9); 1175–1165(9.7); 990(3); 925(4); 870(8); 840–(9.7).

EXAMPLE 6

*3,5 - dimethyl-3,5-di-t-perbutoxy - 1,2 - peroxycyclopentane(di-t-butyl derivative of VI).*—To 40.8 g. (0.6 mole) of 50% hydrogen peroxide containing 1% sulfuric acid was added at 0° C. with rapid stirring in the course of ½ hr. 20.0 g. (0.2 mole of 2,4-pentanedione. The mixture was allowed to stand at room temperature for 4 hrs. then added dropwise with rapid stirring in the course of ½ hr. to a cold (0° C.) mixture of 56 g. of 70% sulfuric acid and 29.6 g. of t-butyl alcohol. The reaction mixture separated into two layers. The non-aqueous layer (upper) was removed and the aqueous layer extracted with 2×100 ml. of ether. The ether extracts were combined with the non-aqueous layer and shaken with 2×50 ml. of saturated solution of ammonium sulfate, dried and the ether removed at 60° C. The residue was subjected for 2 hrs. to a vacuum of 2 mm. at 60° C. to remove any di-t-butyl peroxide that might have formed. The residual thick oil (30.5 g.; 55%) failed to crystallize. Several active oxygen determinations gave values 0.7–1.5% higher than the theoretical, and an infrared spectrum showed the presence of a low intensity hydroperoxy group.

The oil was then dissolved in 200 ml. of ether and extracted with 2×50 ml. of 20% potassium hydroxide to remove the peroxide containing hydroperoxy groups. The ether solution was dried and the ether removed in vacuum. The residual oil was subjected to a vacuum of 2 mm. at 60–70° C. and the final residue analyzed.

*Analysis.*—Calcd. for $C_{12}H_{26}O_6$: (O), 17.28. Found: (O), 17.42 (HI+$CH_3COOH$ method).

An infrared spectrum of a film showed the following bands in cm.$^{-1}$: 3000(9.7); 1478(9); 1430(9.6); 1375–1360(9.8); 1320(9.8); 1250–1155(9.8); 1085(9.8); 1035–(6.3); 955(9); 910(8.8); 878–845(9.9); 820(9.7); 760(9.5); 660(7.2).

EXAMPLE 7

*Reaction of 2,5-hexanedione (acetonylacetone) with hydrogen peroxide.*—To 40.8 g. of 50% hydrogen peroxide maintained at 0° C. was added dropwise with rapid stirring in the course of one hour, 34.4 g. of neutral, freshly distilled 2,5-hexanedione. The reaction mixture was allowed to warm to room temperature and kept under these conditions for four days. A chromatogram taken of the crude mixture, using hydrogen iodide-glacial acetic acid as the detecting agent, showed the presence of five different peroxides. The percentage of each peroxide was estimated from the intensity of its $R_f$ to be approximately $R_f$: O.O, 85%; 0.09, traces; 0.220, 9%; 0.350, traces; 0.665, 6%.

The reaction mixture was transferred to a separatory funnel and extracted with pentane (200 ml.). A paper chromatogram of the pentane solution showed the presence of all the spots of the original mixture except the one with $R_f$, O.O. The pentane solution was then washed successively with a saturated solution of ammonium sulfate and water, dried and filtered. When the filtrate was cooled to −70° colorless crystals separated out which were recrystallized several times from pentane. A paper chromatogram taken of the crystals (M.P. 132° C.) showed a very strong spot with $R_f$: 0.220 and minute trace spots with $R_f$'s 0.09 and 0.350. A chromatogram of the mother liquors likewise showed a very strong spot with $R_f$, 0.665 and small trace spots with $R_f$'s 0.09 and 0.350.

Both the crystals and the mother liquor were therefore subjected to cellulose powder chromatography using the same technique previously published from this Laboratory (loc. cit.). From the crystals was obtained peroxide (X) which gave a single strong spot on a paper chromatogram with an $R_f$, 0.220; M.P. 135° C.

*Analysis.*—Calcd. for $C_{12}H_{22}O_8$(X): C, 48.98; H, 7.53; (O), 16.31; mol. wt., 294.3. Found: C, 49.20; H, 7.56; (O), 16.28 (KI+$CH_3COOH$ method); mol. wt., 292 (Cryoscopic in dioxane).

The infrared spectrum 10% in chloroform showed the following principal bands in cm.$^{-1}$: 3400(8); 2998(5); 2980(3.5); 1455(6.5); 1440(6.5); 1410(6); 1378(9.3) 1330-(4.5); 1308(4.4); 1280(6); 1205–1234(8.5); 1110(9); 1100(9.5); 1085(8.5); 1058(8.2); 985(9.3); 945(7.3); 915(7); 900(6.5); 870(8.9); 850(8.9).

Using the (Brewster-Cotte) procedure mentioned in Example 3, the bis-p-nitrobenzoate (XI) was prepared from peroxide IV in 30% yield; M.P. 105° (explosive) from methyl alcohol.

*Analysis.*—Calcd. for $C_{26}H_{28}N_2O_{14}$(XI): C, 52.70; H, 4.76; N, 4.73. Found: C, 52.74; H, 4.95; N, 4.79.

EXAMPLE 8

When the mother liquor from Example 7 was subjected to cellulose powder chromatography, peroxide (XII) was obtained free from traces of other peroxides. It showed a single strong spot on a paper chromatogram, using hydrogen iodide and glacial acetic acid as the detecting agent, with an $R_f$, 0.665; M.P. 105° (dec.).

*Analysis.*—Calcd. for $C_{12}H_{20}O_6$(XII): C, 55.38; H, 7.74; (O), 12.30; mol. wt., 260.3. Found: C, 55.47; H, 7.72; (O), 12.80; mol. wt., 260 (in exaltone).

The infrared spectrum 10% in chloroform showed the following principal bands in cam.$^{-1}$: 2998(8); 2980(6); 2850(3); 1455(7); 1445(7); 1378(9.3); 1330(4.5); 1315(8.3); 1275(6); 1240(7.8); 1210–1230(7); 1190-(9.2); 1130(9.8); 1110(9.8); 1082(4); 1050(9); 995-(9.2); 950(5); 925(8); 885(9); 870(9).

Peroxide (XII) reacts very slowly with potassium iodide in glacial acetic acid and its infrared spectrum shows no hydroxyl groups, indicating that it has a cyclic structure as represented by formula (XII).

*Purification of peroxide with $R_f$, O.O.*—The aqueous layer from the original reaction mixture of Example 7 after the pentane extraction, contained all of the peroxide (ca. 85%) with $R_f$, O.O. It was extracted with 2×100 ml. of ethyl ether and the ether extracts washed with 2×50 cc. of saturated ammonium sulfate then once with water, dried and the ether removed in vacuum (50 mm.), leaving a colorless viscous oil. This oil had an active oxygen of 19.5% and a mol. wt. of 148 (in dioxane). Attempts to crystallize the oil from ether, dichloromethane and other solvents were not successful. A paper chromatogram gave a single strong spot which failed to move from the origin, with traces of peroxides with $R_f$'s: 0.09, 0.220, 0.665. An attempt was made to dissolve this peroxide in water when most of it precipitated out as a white solid; M.P. 110° C. (after drying in vacuum). When this was subjected to cellulose column chromatography, more than 85% was obtained having an $R_f$, 0.220 (peroxide X) and a M.P. 135° C.

Moreover, when the oily peroxide with $R_f$, O.O was subjected to prolonged high vacuum (0.1 mm.) at 50° C. it was converted completely to peroxide (X) which could be obtained pure by a single crystallization from ether without the use of cellulose column chromatography. Furthermore, since the peroxide with $R_f$, O.O in the original mixture was the only peroxide detected when the ratio of acetonylacetone to hydrogen peroxide used was 1 to 4, it was possible to obtain peroxide (X) by the above conversion in nearly quantitative yields.

*Reaction of peroxide, $R_f$, O.O with phosphorus pentoxide.*—A solution of 100 mg. of the peroxide, $R_f$, O.O in 100 ml. of anhydrous ether was cooled to 0° C. and to it was added with frequent shaking in the course of 8 hrs., 2 g. of phosphorus pentoxide in 8 equal portions. The final mixture was filtered into a separatory funnel and washed with 50 ml. of saturated sodium bicarbonate, dried and concentrated to about ¼ its volume. Using a paper chromatogram, the following peroxides were estimated from the intensity of their spots to be present in the solution: peroxide (XII), $R_f$, 0.665, 70%; peroxide (X), $R_f$, 0.220, 10% and unreacted peroxide $R_f$, O.O, 20%.

EXAMPLE 9

*Reaction of 2,5-hexanedione with hydrogen peroxide in the presence of mineral acids.*—To 27.2 g. (0.4 mole) of 50% hydrogen peroxide containing 1% sulfuric acid and cooled to 0° C. was added in the course of ½ hr. with rapid stirring 11.4 g. (0.1 mole) of freshly distilled 2,5-hexanedione. The mixture was allowed to stand at 0° C. for 3 hours, then at room temperature for 4 days whereby white crystals separated and removed by filtration; yield, 31.7%. This was recrystallized from dichloromethane into long needles, M.P. 131° C. This peroxide (XVIII) is very sensitive to shock and explodes with considerable brisance.

*Analysis.*—Calcd. for $C_6H_{12}O_6$: C, 40.01; H, 6.71; (O), 26.64; mol. wt., 180.2. Found: C, 40.16; H, 6.65; (O), 26.50 ($KI+CH_3COOH$ method); mol. wt., 181.4 (cryoscopic in dioxane).

The infrared spectrum of a mull in nujol showed the following bands in cm.$^{-1}$: 3300(8.5); 2885–2995(9.8); 1445(9.3); 1370(9.2); 1340(6.5); 1270(7.2); 1245(5.3); 1155(7.8); 1110–1120(8.2); 1060(7.5); 1020(4.5); 960-(5); 935(4); 920(5.5); 890(4.5); 865(8).

The bis-p-nitrobenzoate ester of the above dihydroperoxyperoxide was prepared according to Brewster and Cotte, Jr.; yield, 78.7%; M.P. 165° C. (dec.), (J. H. Brewster and C. J. Cotte, Jr., J. Am. Chem. Soc., 77, 6214 (1955)) from absolute ethyl alcohol.

*Analysis.*—Calcd. for $C_{20}H_{18}N_2O_{12}$: N, 5.86; (O), 10.03. Found: N, 5.96; (O), 10.42.

I claim:

1. An organic peroxide of the formula

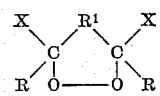

wherein $R^1$ is lower alkylene, the R's are lower alkyl and the X's are members of the group consisting of —OH, —OOH and —OO— lower alkyl.

2. An organic peroxide as defined in claim 1 wherein each X is OOH.

3. An organic peroxide as defined in claim 1 wherein each X is OH.

4. An organic peroxide of the formula

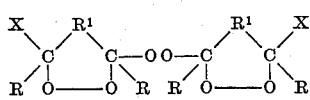

wherein the $R^1$'s are lower alkylene, the R's are lower alkyl and the X's are members of the group consisting of —OH, —OOH and —OO— lower alkyl.

5. An organic peroxide of the formula

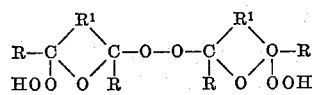

wherein the $R^1$'s are lower alkylene and the R's are lower alkyl.

6. The compound of the formula

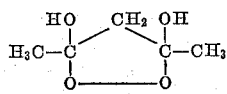

7. The compound of the formula

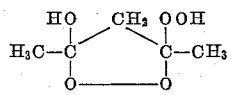

8. The compound of the formula

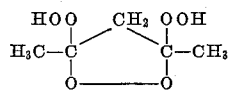

9. The compound of the formula

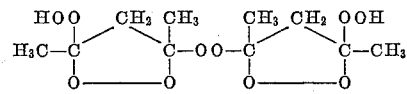

10. The compound of the formula

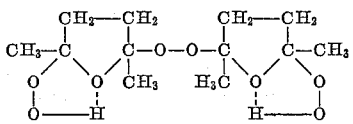

11. The bis-p-nitrobenzoate of the compound of claim 8.

12. The compound of the formula

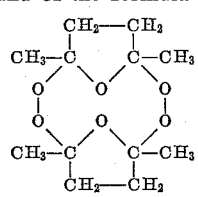

13. The compound of the formula

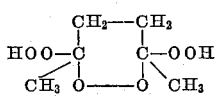

14. The compound of the formula

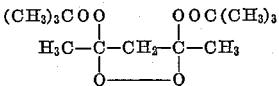

15. The bis-p-nitrobenzoate of the compound of claim 13.

References Cited in the file of this patent

UNITED STATES PATENTS

| | | |
|---|---|---|
| 2,092,322 | Moser | Sept. 7, 1937 |
| 2,107,059 | Moser | Feb. 1, 1938 |
| 2,133,733 | Moser | Oct. 18, 1938 |
| 2,424,851 | Rudoff | July 29, 1947 |

OTHER REFERENCES

Milas et al.: "J. Am. Chem. Society," vol. 81, pages 3361–3364, (1959.)